(12) United States Patent
Greco (10) Patent No.: US 11,079,107 B1
(45) Date of Patent: Aug. 3, 2021

(54) FLUID FLOW DIVERTER USING PURGE FLUID TO CREATE A POSITIVE PRESSURE FLUID BARRIER

(71) Applicant: Huntington Energy Systems LLC, Hernando, FL (US)

(72) Inventor: Richard Greco, Hernando, FL (US)

(73) Assignee: Huntington Energy Systems LLC, Hernando, FL (US)

( * ) Notice: Subject to any disclaimer, the term of this patent is extended or adjusted under 35 U.S.C. 154(b) by 0 days.

(21) Appl. No.: 16/769,281

(22) PCT Filed: Oct. 21, 2019

(86) PCT No.: PCT/US2019/057192
§ 371 (c)(1),
(2) Date: Jun. 3, 2020

(87) PCT Pub. No.: WO2020/185260
PCT Pub. Date: Sep. 17, 2020

Related U.S. Application Data (60) Provisional application No. 62/816,084, filed on Mar. 9, 2019.

(51) Int. Cl.
*F23G 7/06* (2006.01)
*F16K 11/07* (2006.01)
(Continued)

(52) U.S. Cl.
CPC ............ *F23G 7/068* (2013.01); *F16K 11/074* (2013.01); *F16K 25/02* (2013.01); *F23G 2207/101* (2013.01); *F28D 17/02* (2013.01)

(58) Field of Classification Search
CPC ... F16K 11/074; F16K 25/02; Y10T 137/4259
See application file for complete search history.

(56) References Cited

U.S. PATENT DOCUMENTS

| 3,045,692 A | 7/1962 | Reynolds |
| 3,045,962 A | 7/1962 | Reynolds |

(Continued)

FOREIGN PATENT DOCUMENTS

WO 2020/185260 A1 9/2020

OTHER PUBLICATIONS

International Search Report and Written Opinion for PCT/US19/57192; dated Dec. 26, 2019.

*Primary Examiner* — Kevin R Barss
(74) *Attorney, Agent, or Firm* — Fleit Intellectual Property Law; Paul D. Bianco; Stephen Bongini (57) ABSTRACT

A fluid flow diverter is provided that includes a diverter body having four ports, a rotating plenum located within the diverter body, and a purge fluid assembly that supplies a purge fluid to the plenum. The plenum has two stop positions that each define a fluid flow path through the diverter. In the first fluid flow path, a first fluid stream goes between the first and second ports, and a second fluid stream goes between the fourth and third ports. In the second flow path, a first fluid stream goes between the first and third ports, and a second fluid stream goes between the fourth and second ports. The purge fluid supplied to the plenum creates a positive pressure fluid barrier that prevents or minimizes cross-contamination of the two fluid streams through the diverter. Also provided is a regenerative thermal oxidizer that includes such a fluid flow diverter.

13 Claims, 5 Drawing Sheets

(51) Int. Cl.
  *F16K 11/074* (2006.01)
  *F16K 25/02* (2006.01)
  *F28D 17/02* (2006.01)

(56) References Cited

U.S. PATENT DOCUMENTS

| | | |
|---|---|---|
| 5,375,622 A | 12/1994 | Houston |
| 6,039,927 A | 3/2000 | Greco |
| 7,150,446 B1 | 12/2006 | Cash |
| 2011/0061576 A1 | 3/2011 | Greco |
| 2011/0081277 A1 | 3/2011 | Balon et al. |
| 2014/0230919 A1 | 8/2014 | Rhoads |

FLUID FLOW DIVERTER USING PURGE FLUID TO CREATE A POSITIVE PRESSURE FLUID BARRIER

FIELD OF THE DISCLOSURE

The disclosure generally relates to fluid flow diverters, and more specifically to fluid flow diverters that cyclically reroute fluid flow with minimal or no leakage between the fluid flow paths.

BACKGROUND

A fluid flow diverter reroutes the flow of fluids through a system. Fluid flow diverters are used to minimize the commingling of different fluid streams in systems that require a rapid change in the flow pattern of the fluids. One such system is a regenerative thermal oxidizer (RTO), which is used in a number of industries to reduce the quantity of contaminants in industrial process effluent gases.

In an RTO, incoming process effluent gases are oxidized in a combustion chamber and then directed through a heat exchanger before being sent to an exhaust stack. In the heat exchanger, up to 95% of the heat from the high-temperature combustion gases is transferred to the heat exchange media. The flow of gases is then rerouted so that the incoming process gases move through that heat exchanger before entering the combustion chamber. Heat is transferred from the hot heat exchange media to the process gases so that less energy is required to oxidize the process gases in the combustion chamber.

A two chamber RTO has two heat exchangers that are separately connected to a shared combustion chamber. A first flow path begins with the first heat exchanger, then goes to the combustion chamber, and then passes through the second heat exchanger and on to the exhaust stack. After the second heat exchanger captures heat from the outgoing gases, the gas flow through the RTO is rerouted so that the incoming process gases can be heated by the second heat exchanger. In particular, the incoming gases are redirected so as to follow a second flow path that begins with the second heat exchanger, then goes to the combustion chamber, and then passes through the first heat exchanger and on to the exhaust stack. After the first heat exchanger captures heat from the outgoing gases, the gas flow through the RTO is rerouted back to the first flow path, and the process is repeated. A fluid flow diverter is used to accomplish this repeated rerouting of the fluid flow through the RTO while minimizing the discharge of unoxidized process gas into the atmosphere.

A conventional fluid flow diverter typically includes a valve system that uses poppet valves connected to a valve shaft. The gas moving through the valve is directed by the position of a disc (or "poppet") that is moved linearly between two opposed valve seats. One example of such a fluid flow diverter that can be used use in a two chamber RTO is disclosed in U.S. Pat. No. 6,039,927, entitled "Valve System for Regenerative Thermal Oxidizers," the entire disclosure of which is herein incorporated by reference. This fluid flow diverter has a valve system with two side-by-side poppet valves that are actuated by an eccentric mechanical drive assembly having a variable speed (or variable frequency) motor, a gear reducer, and a single drive shaft. In an alternate configuration of the valve system, the eccentric mechanical drive assembly controls two sets of butterfly valves.

Both fluid flow diverter configurations disclosed in U.S. Pat. No. 6,039,927 are effective and have been used in many RTOs. However, these fluid flow diverters have distinctive drawbacks. The first fundamental drawback is the complexity of the valve system. Additionally, the valve seals in these valve systems have a tendency to leak over time for a variety of reasons.

In view of the foregoing, an improved fluid flow diverter is needed. In particular, what is needed is a fluid flow diverter that overcome these drawbacks while maintaining the use of an eccentric mechanical drive assembly.

SUMMARY OF THE DISCLOSURE

One embodiment of the present disclosure provides a fluid flow diverter that includes a diverter body having four ports, a rotating plenum located within the diverter body, and a purge fluid assembly that supplies a purge fluid to the rotating plenum. The rotating plenum has a first stop position that defines a first fluid flow path through the diverter, and a second stop position that defines a second fluid flow path through the diverter. Each of the fluid flow paths define first and second fluid streams. In the first fluid flow path, the first fluid stream goes between the first port and the second port, and the second fluid stream goes between the fourth port and the third port. In the second flow path, the first fluid stream goes between the first port and the third port, and the second fluid stream goes between the fourth port and the second port. The purge fluid supplied to the rotating plenum creates a positive pressure fluid barrier that prevents or minimizes cross-contamination of the first and second fluid streams in the first and second fluid flow paths.

Another embodiment of the present disclosure provides a regenerative thermal oxidizer that includes a combustion chamber first and second heat exchangers in flow communication with the combustion chamber, and a fluid flow diverter in flow communication with the first and second heat exchangers. The fluid flow diverter includes a diverter body, a rotating plenum located within the diverter body, and a purge fluid assembly that supplies a purge fluid to the rotating plenum. The diverter body has an inlet port that receives process gases, a second port in flow communication with first heat exchanger, a third port in flow communication with second heat exchanger, and an outlet port. The rotating plenum has a first stop position that defines a first fluid flow path through the regenerative thermal oxidizer, and a second stop position that defines a second fluid flow path through the regenerative thermal oxidizer. In the first fluid flow path, the process gases received at the inlet port pass through the second port, then the first heat exchanger, then the combustion chamber, then the second heat exchanger, then the third port, and then exit the outlet port of the diverter. In the second flow path, the process gases received at the inlet port pass through the third port, then the second heat exchanger, then the combustion chamber, then the first heat exchanger, then the second port, and then exit the outlet port of the diverter. The purge fluid supplied to the rotating plenum creates a positive pressure fluid barrier that prevents or minimizes bypass leakage from the inlet port to the outlet port of the diverter.

Other objects, features, and advantages of the present disclosure will become apparent from the following detailed description. It should be understood, however, that the detailed description and specific examples, while indicating preferred embodiments of the present disclosure, are given by way of illustration only and various modifications may naturally be performed without deviating from the present disclosure.

DETAILED DESCRIPTION

As required, embodiments of the present disclosure are disclosed herein; however, it is to be understood that the disclosed embodiments are merely examples and that the systems and methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

Embodiments of the present disclosure provide an improved fluid flow diverter. The improved fluid flow diverter rapidly changes the flow of fluids while introducing a purge fluid between the fluid streams in order to minimize or prevent leakage between the flow paths. The improved fluid flow diverter is simple with a single diverter, a single motor, and a single rotating plenum instead of poppet or butterfly valves. This makes the device durable, reliable, and easy to construct and maintain.

Figure 1A:
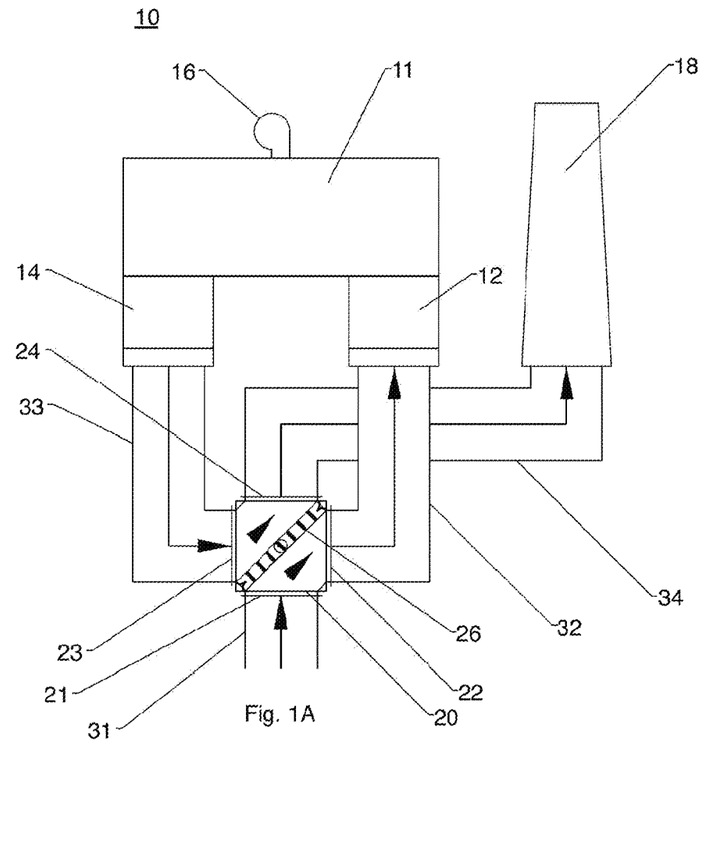
FIGS. 1A and 1B are block diagrams of an RTO with a fluid flow diverter in accordance with an embodiment of the present disclosure.
Figure 1B:
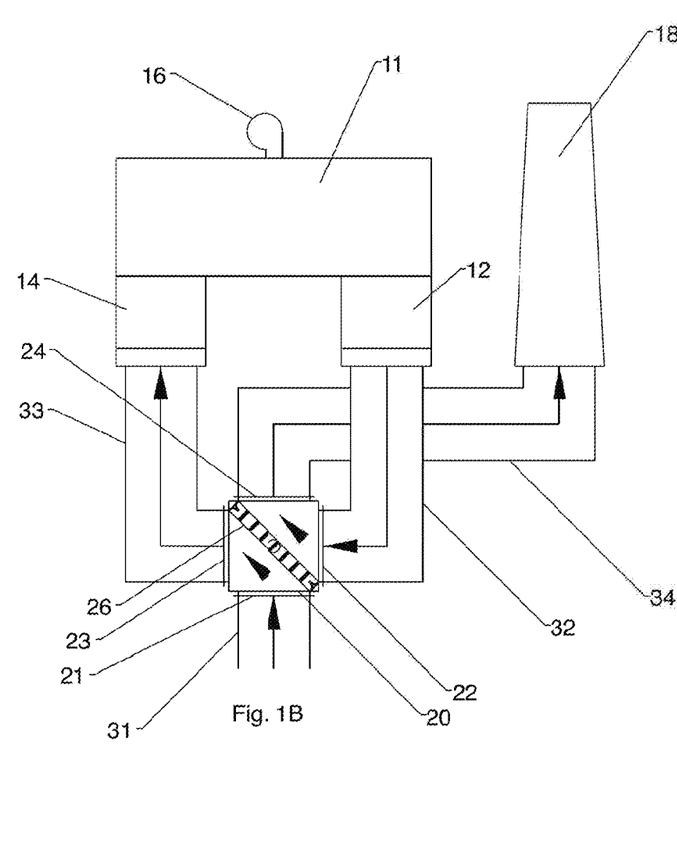

FIGS. 1A and 1B show a regenerative thermal oxidizer (RTO) with a fluid flow diverter in accordance with an embodiment of the present disclosure. The RTO 10 has a common combustion chamber 11 in flow communication with first and second heat exchangers 12 and 14. Each of the heat exchangers 12 and 14 is a chamber housing a heat exchange media such as ceramic saddles or porous ceramic monoliths. A four-port fluid flow diverter 20 is also in flow communication with the first and second heat exchangers 12 and 14.

In particular, the fluid flow diverter 20 has a first (inlet) port 21 that receives the industrial process effluent gases via a first transfer duct 31, and a fourth (outlet) port 24 that is connected to an exhaust stack 18 via a fourth transfer duct 34. A second port 22 of the diverter 20 is connected through a second transfer duct 32 to one end of the first heat exchanger 12, and third port 23 of the diverter 20 is connected through a third transfer duct 33 to one end of the second heat exchanger 14. The opposite ends of first and second heat exchangers 12 and 14 are connected to the combustion chamber 11, which is equipped with a burner 16.

The diverter 20 defines several fluid flow passages through which gases flow as directed by the position of a rotating plenum 26 within the diverter. When the plenum 26 is in a first stop position as shown in FIG. 1A, the inlet port 21 is in communication with the second port 22, and the outlet port 24 is in communication with the third port 23. Thus, the process gases from the process stream follow a first flow path through the diverter 20 that enters at the inlet port 21 and exits at the second port 22. The gases then pass through the first heat exchanger 12, into the combustion chamber 11, and out through the second heat exchanger 14.

Next, the gases follow a second flow path through the diverter 20 that goes from the third port 23 to the outlet port 24. The gases exiting the outlet port 24 are sent to the exhaust stack 18. With this flow, the process gases are heated in the first heat exchanger 12 (whose media was heated in the previous cycle) before entering the combustion chamber 11. And the hot gases exiting the combustion chamber 11 transfer heat to the heat exchange media of the second heat exchanger 14.

After a predetermined time, the plenum 26 is rotated 90° into a second stop position as shown in FIG. 1B. In this position, the inlet port 21 is in communication with the third port 23, and the outlet port 24 is in communication with the second port 22. Thus, the process gases from the process stream follow a third flow path through the diverter 20 that enters at the inlet port 21 and exits at the third port 23. The gases then pass through the second heat exchanger 14, into the combustion chamber 11, and out through the first heat exchanger 12. Next, the gases follow a fourth flow path through the diverter 20 that goes from the second port 22 to the outlet port 24. The gases exiting the outlet port 24 are sent to the exhaust stack 18. With this flow, the process gases are heated in the second heat exchanger 14 before entering the combustion chamber 11, and then the hot gases exiting the combustion chamber 11 transfer heat to the heat exchange media of the first heat exchanger 12.

The fluid flow diverter 20 is formed of a box-shaped diverter assembly, a drive motor and controller assembly, and a purge fluid assembly. The diverter assembly physically routes the flow of fluids through the diverter. The drive motor and controller assembly actuates the diverter assembly to reroute the fluid flow at predetermined timings in a cycle. The purge fluid assembly provides clean purge fluid to the diverter assembly to create a positive pressure fluid barrier that prevents cross-contamination of the fluid streams.

Figure 2:
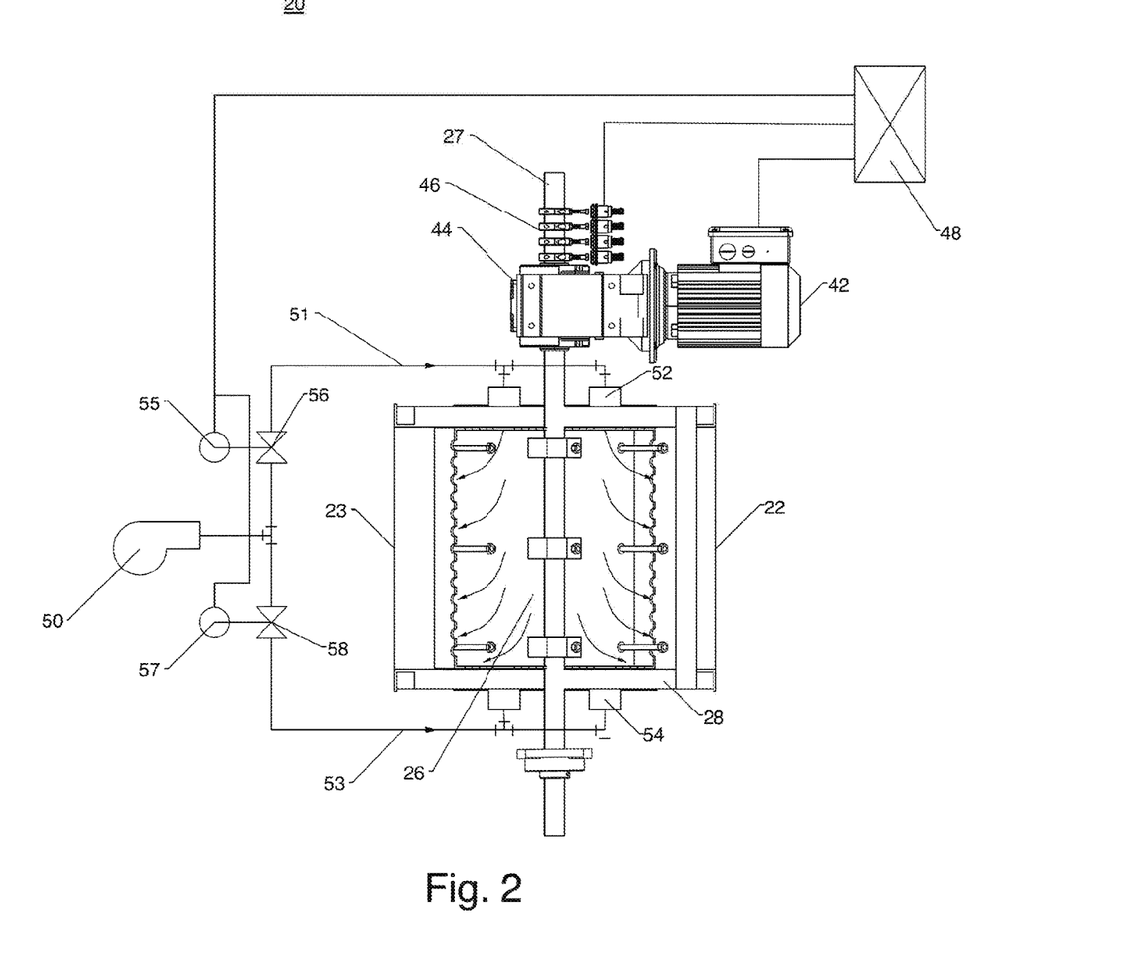
FIG. 2 is a side view of a fluid flow diverter according to one embodiment of the present disclosure.

FIG. 2 illustrates a fluid flow diverter according to one embodiment of the present disclosure. The diverter assembly portion of this diverter 20 includes a square diverter body 28 and a rotating fluid flow diverter plenum 26. The diverter body 28 generally has a box (e.g., cube) shape with a solid top and bottom, and four sides that each have an opening that forms one of the ports. The plenum 26 is connected to and rotates about a single drive shaft 27 that passes through apertures in the centers of the top and bottom surfaces of the diverter body 28. The bottom extension of the drive shaft is retained by an external guide bearing.

The plenum 26 is formed as a hollow rectangular box (e.g., rectangular cuboid) that fits within the diverter body 28. The height of the plenum 26 substantially matches the interior height of the diverter body 28 and the width of the plenum substantially matches the distance between diagonally opposite rounded vertical corners of the diverter body 28 (with allowances for clearance). The plenum 26 makes clearance contact between the top and bottom of the diverter body 28, and also with the four rounded vertical corners of the diverter body 28. Enough clearance is provided between the walls and corners of the diverter body and plenum to allow for thermal expansion of the diverter body-plenum interface. In some embodiments, the outside edges of the plenum 26 are lined with high operating temperature seals that are made of a material that is capable of handling the process temperature (i.e., seals suitable for the process flow application). For example, the outside edges where the plenum 26 makes clearance of the communicating surfaces of the diverter body 28 can be lined with high operating temperature brush seals or high operating temperature flexible material, such as RTV silicone seals, flexible metal wiper seals, or tadpole gaskets. These seals help prevent cross-contamination of the fluid streams.

The drive motor and controller assembly includes an electric motor 42, a gear reducer 44, control components 46, and a variable speed drive controller 48. The motor 42 is a three-phase variable frequency braking motor that turns the drive shaft 27 via the gear reducer 44, which is connected to the top extension of the drive shaft 27. The gear reducer 104 steps down the motor speed and also prevents the drive shaft 27 from reversing or coasting beyond top or bottom dead center. The control components 46 (e.g., proximity switches) are located on the drive shaft 27 and provide position information to the variable speed drive controller 48. The drive controller 48 regulates the speed of the motor 42 to control the rotation speed, along with the acceleration and deceleration, of the drive shaft.

The drive motor and controller assembly provides a rapid change of position and precise stopping point for the drive shaft. In particular, the rotation of the drive shaft 27 is controlled by the drive controller 48 such that the plenum 26 controllably rotates within the diverter body 28 through the motion generated by the motor 42. The plenum 26 is made to repeatedly rotate 90° in the same direction in timed increments, so as to repeatedly switch between the two fluid flow patterns. In this exemplary embodiment, a timing command from the drive controller 134 starts the motor 42 to initiate rotation of the drive shaft 27 via the gear reducer 44. The drive shaft 27 accelerates to a predetermined speed and then, after predetermined rotation, the control components are triggered to start deceleration. The drive controller 48 stops the drive shaft 27 when the plenum has rotated the full 90° to its next predetermined stop position. In one embodiment, an internal motor encoder pulse counter controls total movement so as to place the stop position of the drive shaft exactly 90° past the previous stop position.

The acceleration and deceleration of the drive shaft 27 is controlled by the drive controller 48 (via a variable speed regulator associated with the motor) to slow the plenum as it nears the stop position in this exemplary embodiment. As an example, if the proximity switch is set to set to trigger deceleration at 45° rotation of the drive shaft, and the variable speed drive controller 48 is set at a rotation speed of ½ rps, an acceleration rate of 0.2 seconds, and a deceleration rate of 0.3 seconds, then the drive shaft 27 will accelerate up to one rps in 0.2 seconds, trigger at 45°, and then decelerate for 0.3 seconds. This produces a bell curve time speed relationship in which the drive shaft 27 (and thus the plenum) moves through the full 90° rotation to the next stop position in ½ second, with a velocity of zero at the beginning and end of travel. In other embodiments, the plenum rotates in 90° increments in less than ½ second.

In this exemplary embodiment, the purge fluid assembly includes a purge fluid propelling device 50 (e.g., a high pressure fan or blower), first solenoid and valve 55 and 56, and second solenoid and valve 57 and 58. First and second purge fluid input ports 52 and 54 are located on the top and bottom of the diverter body 28. These purge fluid input ports are aligned in a diagonal arrangement from corner to corner on the top and bottom of the body so as to form an X-shaped pattern. The valves within the closed passageways, under control of the solenoids, direct the purge fluid to the purge fluid input ports that align with the current stop point of the plenum.

The fan 50 supplies the purge fluid (e.g., air) to the plenum 26 through two distinctive paths. The first purge fluid path goes through the first valve 56, into a first closed passageway 51, and then through the first purge fluid input ports 52. The second purge fluid path goes through the second valve 58, into a second closed passageway 53, and then through the second purge fluid input ports 54. The drive controller 48 controls the solenoids 55 and 57 so that the corresponding valves 56 and 58 direct the flow of the purge fluid through the desired closed passageway to the connected input ports. Each of the distinctive purge fluid paths is selectively activated to coincide with one of the diagonal stop positions of the plenum, so that the purge fluid enters the plenum through the input ports on the diagonal that currently aligns with the plenum.

The exterior of the plenum 26 is generally solid with holes on its upper and lower faces to allow purge fluid from the input ports to enter the interior of the plenum. There are also holes on the narrow vertical faces of the plenum 26 so that the purge fluid in the interior of the plenum creates a positive pressure "fluid barrier". This positive pressure minimizes or prevents cross-contamination of the two streams of gases passing through the diverter.

Figure 3A:
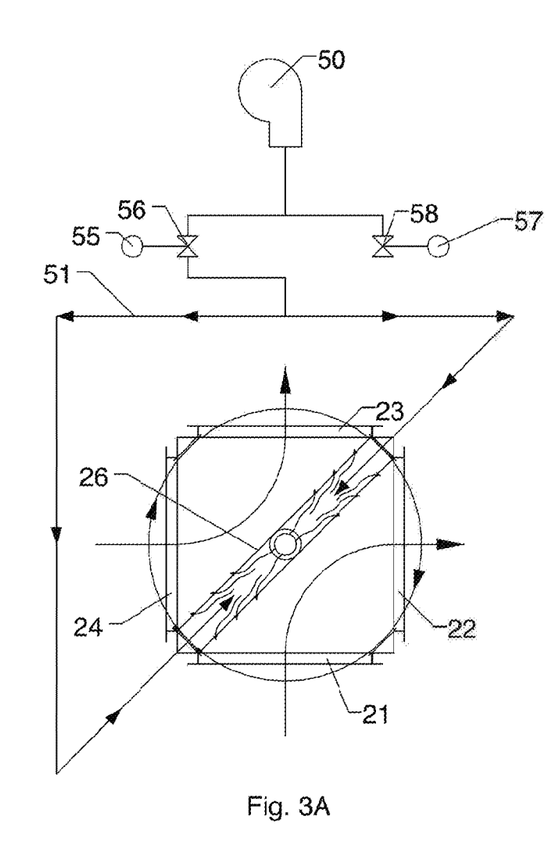
FIGS. 3A and 3B illustrate the operation of the fluid flow diverter of FIG. 2.

FIGS. 3A and 3B illustrate the operation of the fluid flow diverter of FIG. 2. When the plenum 26 is in the first stop position (i.e., 45° or 225°) shown in FIG. 3A, the contaminated industrial process gases introduced into the first port 21 are diverted by the plenum 26 to the second port 22 that is connected to the first heat exchanger 12. At the same time, combusted gases from the second heat exchanger 14 entering the third port 23 are diverted by the plenum 26 to the fourth port 24. Further, high pressure clean purge fluid (e.g., air) from the fan 50 is introduced through the first valve 56 to the first purge fluid inlet ports 52 located on the top and bottom of the diverter body. In this first stop position, one side of the holes in the X pattern on the top and bottom of the diverter body align with the top and bottom of the plenum 26. Thus, the purge fluid is forced into the interior of the hollow plenum 26 (through the holes in its top and bottom).

Figure 3B:
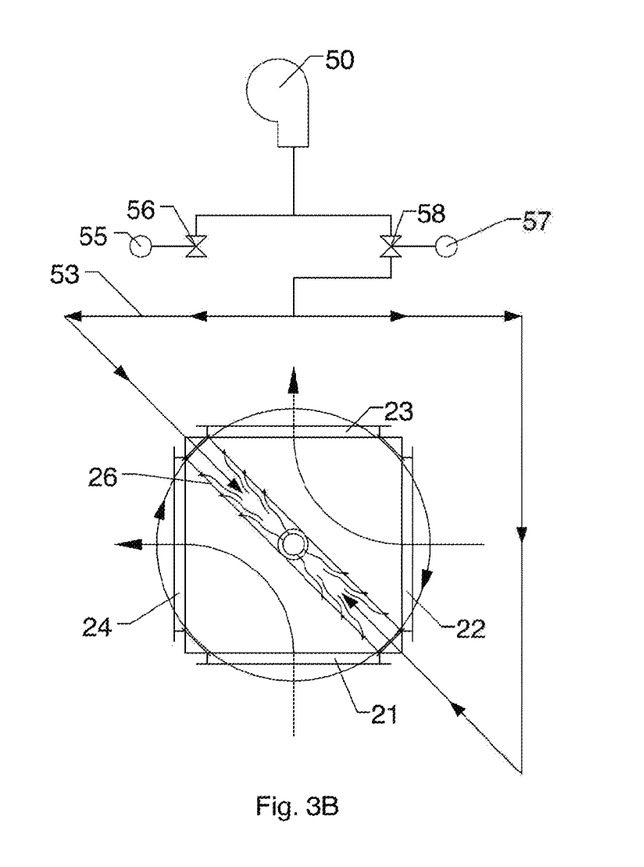

After a predetermined time, the plenum 26 rotates (indexes) 90° to the second stop position (i.e., 135° or 315°) shown in FIG. 3B. In this position, the contaminated industrial process gases introduced into the first port 21 are diverted by the plenum 26 to the third port 23 that is connected to the second heat exchanger 14. At the same time, combusted gases from the first heat exchanger 12 entering the second port 22 are diverted by the plenum 26 to the fourth port 24. Further, high pressure clean purge fluid from the fan 50 is introduced through the second valve 58 to the second purge fluid inlet ports 54 located on the top and bottom of the diverter body. In this second stop position, the other side of the holes in the X pattern on the top and bottom of the diverter body align with the top and bottom of the plenum 26. Thus, the purge fluid is again forced into the interior of the hollow plenum 26 (through the holes in its top and bottom).

In this exemplary embodiment, the purge fluid enters the plenum only when the plenum is in one of the stop positions so as to be aligned with the holes in the top and bottom of the diverter body. The purge fluid flow to these holes is controlled by the independent solenoids 55 and 57, which are each activated when the drive controller determines that the plenum has reached a stop position corresponding to the set of holes associated with that solenoid.

The purge fluid introduced into the interior of the hollow plenum pressurizes it with sufficient pressure to overcome the system pressure. Therefore, the clean purge fluid exits the narrow vertical sides of the plenum and is forced out between each edge of the plenum and the corresponding sidewall of the diverter body. Because the pressure of the purge fluid escaping the plenum edges is greater the system pressure, any process gases trying to bypass the rotating plenum will be displaced by the high-pressure clean purge fluid. Thus, such leakage will be forced back upstream of the diverter. The introduction of the high-pressure purge fluid between the fluid streams minimizes or prevents leakage between the flow paths. In other words, the flow through each of the four ports of the diverter is kept separated by way of a high-pressure purge fluid curtain to ensure zero (or at least minimal) leakage of process contaminants from the inlet to the outlet of the system.

Figure 4:
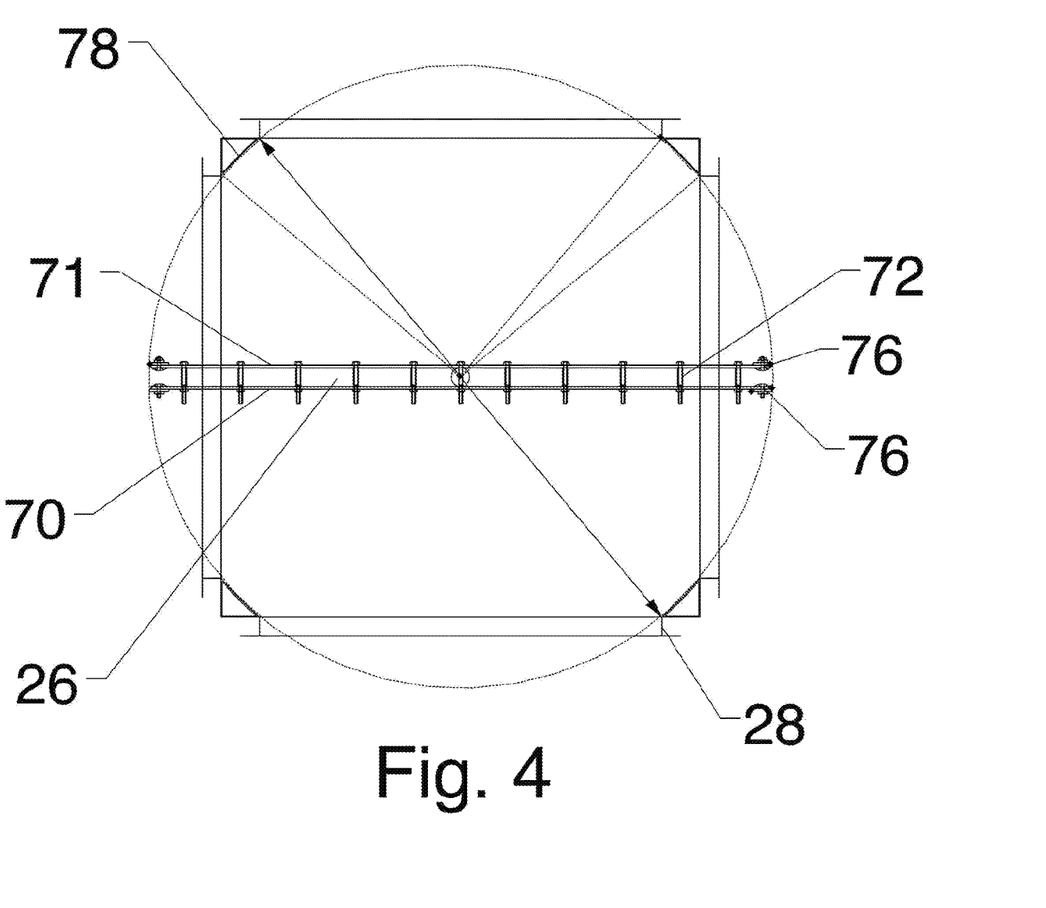
FIG. 4 shows more detail of some components of the fluid flow diverter of FIG. 2.

As shown in FIG. 4, the rotating plenum 26 of this exemplary embodiment is formed by two steel plates 70 and 71 that are connected together by bolts that each pass through a spacer 72. This creates the hollow rectangular cuboid shape of the rotating plenum. Optionally, the top and bottom of the rotating plenum 26 are closed by additional plates (e.g., steel) having a series of holes for receiving the purge fluid. In some embodiments, the narrow vertical faces of the plenum 26 (i.e., between the ends of the steel plates) are closed by additional plates (e.g., steel) having holes for expelling the purge fluid. In other embodiments, the narrow vertical faces of the plenum 26 are left completely open. Bristled brush seals 76 are attached to the outside of the perimeter edges of the rotating plenum 26. Additionally, the four diagonal corners 78 of the diverter body 28 are rounded to the swing diameter of the rotating plenum 29 plus a clearance gap that allows for both plenum and diverter wall expansion. The bristled brush seals 76 make contact with the rounded corners 78 to generate an air seal baffle. This type of seal is totally flexible so as to compress when making contact with the rounded corners.

Figure 5:
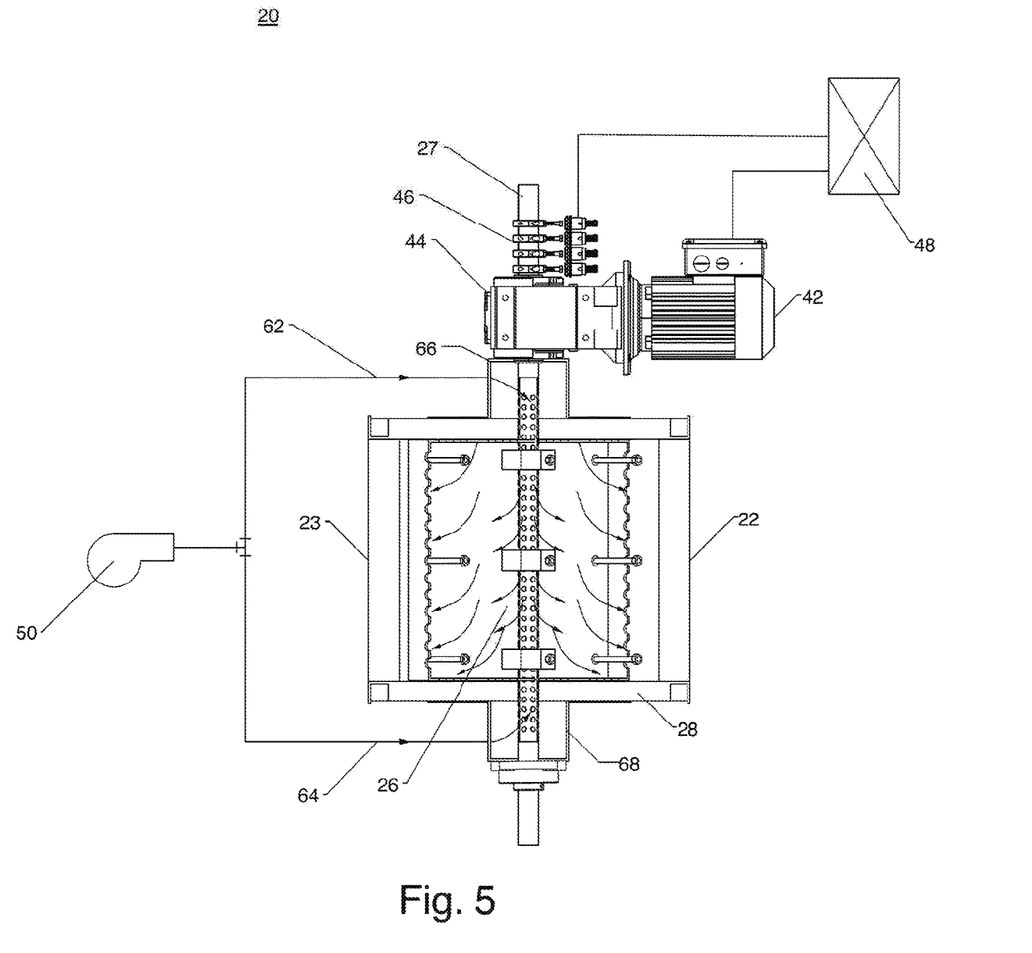
FIG. 5 is a side view of a fluid flow diverter according to another embodiment of the present disclosure.

FIG. 5 shows a fluid flow diverter according to another embodiment of the present disclosure. In this alternative embodiment, exterior plenums on the top and bottom of the diverter body facilitate the introduction of the purge fluid into the rotating plenum. In particular, a closed passageway 62 connects the purge fluid propelling device 50 to an upper exterior plenum 66 attached to the top of the diverter body 28, and another closed passageway 64 connects the purge fluid propelling device 50 to a lower exterior plenum 68 attached to the bottom of the diverter body 28. The drive shaft 27 passes through the upper and lower exterior plenums 66 and 68 and is closed at both ends. The portion of the drive shaft 27 located within the exterior and rotating plenums is hollow and perforated.

During operation, the purge fluid propelling device 50 supplies a constant flow of purge fluid to the upper and lower exterior plenums 66 and 68. The interior of the hollow, perforated drive shaft 27 receives the pressurized purge fluid from the upper and lower exterior plenums 66 and 68. The pressurized purge fluid in the interior of the drive shaft is then expelled into the interior of the rotating plenum 26. This purge fluid is dispersed throughout the rotating plenum 26 and escapes all perimeter edges, so as to create a fluid seal barrier on the perimeter of the rotating plenum (i.e., between the rotating plenum edge and the diverter body).

In another alternative embodiment, expanded apertures on the top and bottom of the diverter body facilitate the introduction of the purge fluid into the rotating plenum. In particular, the closed passageways 62 and 64 connect the purge fluid propelling device 50 to the upper and lower exterior plenums 66 and 68. Each of the exterior plenums 66 and 68 covers an enlarged annular aperture where the drive shaft 27 passes through the diverter body 28. The expanded aperture is greater in diameter than the drive shaft 27. Thus, the pressurized purge fluid entering the upper and lower exterior plenums 66 and 68 is forced through the enlarged apertures in the diverter body 28, along the drive shaft 27, and into the rotating plenum 26. These expanded apertures can be used with a solid drive shaft or a hollow, perforated drive shaft.

In these alternative embodiments, the solenoids and valves are not needed because the flow of the purge fluid is constant and does not require redirection. This supplies a constant fluid barrier at the communicating edges between the rotating plenum and the diverter body. In yet another embodiment, the hollow, perforated drive shaft and/or expanded apertures are added to the embodiment of FIG. 2 to augment the flow of the purge fluid through the purge fluid input ports.

Accordingly, embodiments of the present disclosure provide an improved fluid flow diverter. The improved fluid flow diverter provides four ports with two distinct flow patterns. The sealed diverter is purged with a positive pressure purge fluid and therefore does not require valve seals to prevent (or minimize) bypass leakage from the inlet port to the outlet port. The diverter has one electrically driven moving part that rotates in the same direction in 90° increments to generate the two distinct flow patterns. The diverter is easy to construct and maintain, compact by comparison to other diverters that achieve a similar effect, and most importantly prevents or minimizes cross-contamination of fluid streams.

The improved fluid flow diverter is particularly suited for use in a two-chamber RTO, which requires fast flow reversal between two distinct flow patterns to achieve regenerative heat exchange. The diverter can be used in such an RTO to quickly reverse the flow of process gasses through the heat exchangers with minimal cross-contamination. Each reversal of the flow pattern through the RTO is accomplished by only a 90° rotation of one moving part (a rotating plenum). The plenum can rotate the 90° in less than ½ second. The positive pressure purge fluid and quick flow reversal minimize contaminant bypass leakage.

While the improved fluid flow diverter is particularly suited for use in an RTO, the present disclosure is not so limited and can be used in other systems that require cyclical rerouting of fluid flow with minimal cross contamination of the fluid streams.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

All references cited herein are expressly incorporated by reference in their entirety. It will be appreciated by persons skilled in the art that the present invention is not limited to what has been particularly shown and described herein above. In addition, unless mention was made above to the contrary, it should be noted that all of the accompanying drawings are not to scale. There are many different features to the present invention, and it is contemplated that these features may be used together or separately. Thus, the present invention should not be limited to any particular combination of features or to a particular application. Further, it should be understood that variations and modifications within the spirit and scope of the present invention might occur to those skilled in the art to which the present invention pertains. Additionally, an embodiment may not include all of the features described above. Accordingly, all expedient modifications readily attainable by one versed in the art from the disclosure set forth herein that are within the scope and spirit of the present invention are to be included as further embodiments.

What is claimed is:

1. A fluid flow diverter comprising:
   a diverter body comprising a first port, a second port, a third port, and a fourth port;
   a rotating plenum located within the diverter body, the rotating plenum having a first stop position that defines a first fluid flow path through the diverter and a second stop position that defines a second fluid flow path through the diverter, each of the fluid flow paths defining first and second fluid streams;
   a motor that repeatedly rotates the plenum 90° in the same direction in timed increments, so as to repeatedly switch between the first and second fluid flow paths; and
   a purge fluid assembly supplying a purge fluid to the rotating plenum,
   wherein in the first fluid flow path, the first fluid stream goes between the first port and the second port, and the second fluid stream goes between the fourth port and the third port,
   in the second flow path, the first fluid stream goes between the first port and the third port, and the second fluid stream goes between the fourth port and the second port, and
   the purge fluid supplied to the rotating plenum creates a positive pressure fluid barrier that prevents or minimizes cross-contamination of the first and second fluid streams in the first and second fluid flow paths.

2. The fluid flow diverter according to claim 1, further comprising a drive controller that initiates rotation of the plenum, accelerates the plenum to a predetermined speed, deceleration the plenum, and stops the plenum when the plenum has rotated exactly 90° past the previous stop position.

3. The fluid flow diverter according to claim 1,
   wherein the plenum is hollow and has a rectangular box shape,
   holes are located in the narrow vertical sides of the plenum,
   the purge fluid is supplied to an interior of the plenum at a higher pressure than a pressure of fluids flowing through the diverter, so that the purge fluid exits the holes in the narrow vertical sides of the plenum and is forced out between the communicating edges of the plenum and the diverter body to create the positive pressure fluid barrier.

4. The fluid flow diverter according to claim 3, further comprising:
   a drive controller that controls the rotation of the plenum, the drive controller causing rotation of the plenum to stop exactly 90° past the previous stop position.

5. The fluid flow diverter according to claim 1,
   wherein first holes in an X pattern are located on at least one of the top and bottom of the diverter body, second holes are located in at least one of the top and bottom of the plenum, and
   when the plenum is in one of the stop positions, the purge fluid from the purge fluid assembly passes through the first holes in the diverter body that are aligned with the second holes in the plenum so that the purge fluid is forced into the interior of the plenum.

6. The fluid flow diverter according to claim 1, further comprising:
   a drive shaft that passes through an enlarged aperture in the top or bottom of diverter body, the rotating plenum being connected to the drive shaft; and
   an exterior plenum covering the enlarged aperture where the drive shaft passes through the diverter body, the expanded aperture having a greater diameter than the drive shaft,
   wherein the purge fluid assembly supplies the purge fluid to the exterior plenum, the purge fluid passing from the exterior plenum, through the expanded aperture in the diverter body, and into the interior of the rotating plenum.

7. A fluid flow diverter comprising:
   a diverter body comprising a first port, a second port, a third port, and a fourth port;
   a rotating plenum located within the diverter body, the rotating plenum having a first stop position that defines a first fluid flow path through the diverter and a second stop position that defines a second fluid flow path through the diverter, each of the fluid flow paths defining first and second fluid streams;
   high operating temperature brush seals or high operating temperature flexible material lining outside edges of the plenum that make clearance with communicating surfaces of the diverter body; and
   a purge fluid assembly supplying a purge fluid to the rotating plenum,
   wherein in the first fluid flow path, the first fluid stream goes between the first port and the second port, and the second fluid stream goes between the fourth port and the third port,
   in the second flow path, the first fluid stream goes between the first port and the third port, and the second fluid stream goes between the fourth port and the second port, and
   the purge fluid supplied to the rotating plenum creates a positive pressure fluid barrier that prevents or minimizes cross-contamination of the first and second fluid streams in the first and second fluid flow paths.

8. A regenerative thermal oxidizer comprising:
   a combustion chamber;
   first and second heat exchangers in flow communication with the combustion chamber; and
   a fluid flow diverter in flow communication with the first and second heat exchangers, the fluid flow diverter including:
      a diverter body comprising an inlet port that receives process gases, a second port in flow communication with first heat exchanger, a third port in flow communication with second heat exchanger, and an outlet port;
      a rotating plenum located within the diverter body, the rotating plenum having a first stop position that defines a first fluid flow path through the regenerative thermal oxidizer, and a second stop position that defines a second fluid flow path through the regenerative thermal oxidizer;

a motor that repeatedly rotates the plenum 90° in the same direction in timed increments, so as to repeatedly switch between the first and second fluid flow paths; and a purge fluid assembly supplying a purge fluid to the rotating plenum, wherein in the first fluid flow path, the process gases received at the inlet port pass through the second port, then the first heat exchanger, then the combustion chamber, then the second heat exchanger, then the third port, and then exit the outlet port of the diverter, in the second flow path, the process gases received at the inlet port pass through the third port, then the second heat exchanger, then the combustion chamber, then the first heat exchanger, then the second port, and then exit the outlet port of the diverter, and the purge fluid supplied to the rotating plenum creates a positive pressure fluid barrier that prevents or minimizes bypass leakage from the inlet port to the outlet port of the diverter.

9. The regenerative thermal oxidizer according to claim 8, wherein the diverter further comprises a drive controller that initiates rotation of the plenum, accelerates the plenum to a predetermined speed, deceleration the plenum, and stops the plenum when the plenum has rotated exactly 90° past the previous stop position.

10. The regenerative thermal oxidizer according to claim 8, wherein the plenum of the diverter is hollow and has a rectangular box shape, holes are located in the narrow vertical sides of the plenum, the purge fluid is supplied to an interior of the plenum at a higher pressure than a pressure of fluids flowing through the diverter, so that the purge fluid exits the holes in the narrow vertical sides of the plenum and is forced out between the communicating edges of the plenum and the diverter body to create the positive pressure fluid barrier.

11. The regenerative thermal oxidizer according to claim 8, wherein first holes in an X pattern are located on at least one of the top and bottom of the diverter body, second holes are located in at least one of the top and bottom of the plenum, and when the plenum is in one of the stop positions, the purge fluid from the purge fluid assembly passes through the first holes in the diverter body that are aligned with the second holes in the plenum so that the purge fluid is forced into the interior of the plenum.

12. The regenerative thermal oxidizer according to claim 8, wherein the diverter further comprises:

a drive shaft that passes through an enlarged aperture in the top or bottom of diverter body, the rotating plenum being connected to the drive shaft; and an exterior plenum covering the enlarged aperture where the drive shaft passes through the diverter body, the expanded aperture having a greater diameter than the drive shaft, wherein the purge fluid assembly supplies the purge fluid to the exterior plenum, the purge fluid passing from the exterior plenum, through the expanded aperture in the diverter body, and into the interior of the rotating plenum.

13. The regenerative thermal oxidizer according to claim 8, wherein the diverter further comprises high operating temperature brush seals or high operating temperature flexible material lining outside edges of the plenum that make clearance with communicating surfaces of the diverter body.

\* \* \* \* \*